United States Patent Office

Re. 26,009
Reissued May 3, 1966

26,009

CONTROL OF SLIME IN AQUEOUS LIQUIDS WITH A MONOSUBSTITUTED 2-BROMOACETOPHENONE

Stanley J. Buckman, John D. Pera, and Fred W. Raths, Memphis, Tenn., assignors to Buckman Laboratories, Inc., Memphis, Tenn., a corporation of Tennessee No Drawing. Original No. 3,193,448, dated July 6, 1965, Ser. No. 292,094, July 1, 1963. Application for reissue Aug. 16, 1965, Ser. No. 481,444
10 Claims. (Cl. 162—161)

Matter enclosed in heavy brackets [ ] appears in the original patent but forms no part of this reissue specification; matter printed in italics indicates the additions made by reissue.

The present invention relates to processes and compositions for treating aqueous fluids used in various industrial processes for the purpose of controlling the growth and reproduction of microorganisms. More particularly, this invention relates to a process for the control of slime-forming and other microorganisms in industrial processes involving water and substances that are normally susceptible to microbiological degradation or deterioration in the presence of water, in which the growth and proliferation of such microorganisms interfere in the process itself or affect the quality or character of the resulting product.

Many industrial products when wet or when subjected to treatment in water are normally susceptible to bacterial degradation or deterioration. Wood pulp, starch and proteinaceous substances, animal hides, vegetable tanning liquors, and leather are all damaged or degraded by growth of bacteria and other microorganisms or by enzymes produced by such growth.

Slime consists of matted deposits of microorganisms, fibers and debris, and it may be stringy, pasty, rubbery, tapioca-like, hard or horny and it may have a characteristic odor that is different from that of the liquid suspensions in which it is formed. The microorganisms involved in its formation are primarily different species of sporeforming and nonsporeforming bacteria, particularly capsulated forms of bacteria which secrete gelatinous substances that envelop or encase the cells. Slime microorganisms also include filamentous bacteria, filamentous fungi of the mold type, yeasts, and yeast-like organisms.

Besides being objectionable from the standpoint of general cleanliness and sanitation in breweries, wineries, dairies, paper mills and other industrial plants or establishments, slime may interfere and produce plugging of screens in pulp and paper systems, thus reducing their efficiency. When large amounts of slime become incorporated in the paper sheet, its strength is reduced, and it may consequently break and require rethreading of the machine. In the paper itself, slime may be responsible for unsightly spots, holes, and odors and may produce general discoloration throughout the sheet.

In an attempt to control and mitigate the growth of the microorganisms which tend to form such slimes, it is common practice to use chemical treatment wherein various chemical compounds are added to the aqueous systems. Investigations of the slime-forming microorganisms have disclosed that numerous varieties of bacteria and fungi are the source of the problem and it is often necessary to control these organisms by using several different types of microbiological agents. It would be extremely advantageous if a single chemical treatment were available for the control of the several species of microorganisms occurring in pulp and papermill and other manufacturing processes.

Another aspect of the problem of controlling microorganisms in the the pulp and papermaking industry is that the water used in the papermaking process contains quantities of cellulosic materials which vary in concentration from about 0.1 percent to 50.0 percent by weight. Many chemical microbiological agents have the tendency to be selectively adsorbed by the fiber, thus in effect inactivating the inhibitor. To be effective in the control of microorganisms in pulp and papermills, it is extremely desirable that the chemical be able to control the growth of a number of species of microorganisms and, in addition, such agent should not be adsorbed on the cellulosic fibers.

It has been proposed that certain halogenated ketones, of which 2-bromoacetophenone is a specific example, be used for the control of the microorganisms encountered in industrial process systems. While these compounds are more or less effective in the control of the microorganisms causing the production of slime, the ones which are the most effective possess certain important disadvantages. The most serious disadvantage is that these compounds are lachrymators. As a consequence, workmen handling these products, or solutions containing the same, would of necessity require gas masks. Small quantities of the compounds added to agitated and heated pulp and papermill systems would volatilize or be mixed with warm water vapors so that the machine tenders or other workmen would also be affected. In addition to being a lachrymator, these compounds are severe skin irritants, causing unprotected portions of the skin coming in contact with them or the vapors thereof to break out into a rash. Other related compounds which have been suggested for use in agricultural applications, such as seed treatments and soil sterilizers, and for the treatment of cooling water, have been the nitrosubstituted 2-bromoactophenones. These materials are yellow in color and because of their color may cause a loss in brightness or whiteness of pulp and paper. While the lachrymatory properties of the nitro compounds are not as severe as that of the unsubstituted 2-bromoacetophenone, extreme care still is necessary when handling these compounds. Moreover, the nitrosubstituted acetophenones are even more severe skin irritants than the unsubstituted 2-bromoacetophenone.

It is, therefore, a principal object of the present invention to provide a process for the control of microorganisms, which method obviates the disadvantages of the prior art processes.

It is another object of our invention to provide a process for the control of slime-forming microorganisms in pulp and papermill waters which shall have a high degree of effectiveness over the wide range of concentrations of cellulosic material encountered in such aqueous systems.

It is another object of our invention to provide a process employing a single active toxicant or control agent which normally is relatively completely removed from the finished product by washing with water.

It is yet another object of our invention to provide a new composition of matter for the control of microorganisms.

These and other objects and advantages of the processes and compositions will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

In brief, the foregoing objects and advantages are attained by a process which comprises the addition of a monosubstituted 2-bromoacetophenone having the formula:

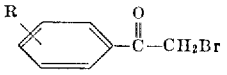

to the aqueous fluids, in an amount sufficient to inhibit the growth of the slime-forming and other microorganisms. In the foregoing formula, R may be hydroxy, methoxy, or acetoxy. When R is methoxy, it may be substituted at the ortho, meta, and para positions and when R is hydroxy or acetoxy, it may be substituted at the meta or para positions. Stated another way, R may be written as $$C_nH_{2n+1}\overset{O}{\overset{\|}{C}}{}_{n'}-O-$$

wherein n and n' are integers varying from 0 to 1 with the provision that when n is 0, n' is 0. It will thus be seen that when both n and n' are 0, the radical is hydroxy (—OH). And when n is 1 and n' is 0, the radical is methoxy (—O—$CH_3$). When n and n' are both 1, the radical is acetoxy $$(-O-\overset{O}{\overset{\|}{C}}-CH_3)$$

When n is 1 and n' is 0, the radical (methoxy) is attached at any one of the positions designated as ortho, meta, or para. When n and n' are each 0, the radical (hydroxy) or when n and n' are each 1, the radical (acetoxy) is attached at the meta or para positions. As to the amount of the substituted 2-bromoacetophenones which may be added to the aqueous systems, suitable and preferred quantities vary from 0.1 to 500 p.p.m. and from 0.2 to 250 p.p.m. respectively.

Before proceeding with specific examples illustrating our invention it may be well to indicate in general the type of compounds useful in the invention.

The invention is restricted to 2-bromoacetophenones which are substituted in either the meta or para position by a single hydroxy, acetoxy or methoxy group or in the ortho position by a methoxy group. We have discovered that these substituents stabilize the 2-bromoacetophenone in both alkaline and acid systems without rendering the 2-bromoacetophenones ineffective toward microorganisms.

The two compounds substituted in the ortho position, 2-bromo-o-hydroxyacetophenone and 2-bromo-o-acetoxyacetophenone, are markedly less effective against microorganisms than is the 2-bromo-o-methoxyacetophenone. Furthermore, the greatest difference between these compounds is at pH 6.5 and 7.5. The explanation for this surprising difference is not known for certain. However, it is well known that 2-halogeno-o-hydroxyacetophenones react to form coumarones in the following manner:

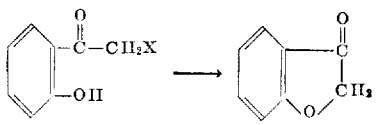

where X is a halogen.

This reaction proceeds particularly smoothly in alkaline solutions. (Chemistry of Carbon Compounds, edited by E. H. Rodd, vol. IV[a], p. 169 and 181, Elsevier Publishing Company, New York, 1957.)

The acetoxy derivative would be subject to easy hydrolysis under these same conditions to the same o-substituted hydroxy compound. On the other hand, the methoxy gorup is a stable one and will not undergo a similar reaction under ordinary conditions.

The compounds covered by this invention have been prepared by methods which are generally thoroughly described in the chemical literature. The most widely used method involves the bromination of the corresponding o-, m-, or p-substituted acetophenone using a molar quantity of bromine equivalent to the molar quantity of the substituted acetophenone. Solvents that may be used include carbon disulfide, chloroform and glacial acetic acid and the temperature of the reactions varies from 0 to 25° C. The 2-position of the acetophenone is alpha to the carbonyl group and is the most active site available for bromination. Therefore, good yields of the 2-bromoacetophenones are usually obtained. In some cases, precautions must be taken to prevent ring bromination. The use of anhydrous, glacial acetic acid as the solvent (Buu-Hoi Xuong and Lavit, Journal of the Chemical Society, 1954, 1034–1038) directs the bromine exclusively to the 2-position, whereas the presence of even small quantities of water cause the benzene ring to be brominated. Excess bromine must be avoided in all of the reactions to prevent polybromination of the compounds.

The 2-bromoacetophenone substituted by acetoxy groups in the ring can be prepared by the reaction of the corresponding hydroxyacetophenones with an acetylating agent, such as acetic anhydride or acetyl chloride. Other methods are described in the literature, but the two methods above are the most practical.

The 2-bromoacetophenones cannot be adequately characterized by bromine analyses, because several isomers with the bromine on the ring and with identical theoretical bromine contents are possible. We used melting points, bromine analyses, ultraviolet and infrared analyses to characterize the compounds. We have found that substitution of a bromine on the 2-position of acetophenone increases the wavelength of the carbonyl absorption band by about 5 to 15 millimicrons and decreases the magnitude of the molecular extinction coefficient about 500 to 3500. In the infrared, the absorption peak that appears at about 10.4 microns for the acetophenones is decreased to about 10.0 to 10.1 microns when the bromine is substituted in the 2-position.

The 2-bromo-m-hydroxyacetophenone is a new composition. Its preparation and properties are described in Example 1.

The 2-bromoacetophenones of this invention are only slightly soluble in water. They can be added to various industral systems as solids but it will be more convenient to market solutions of these compounds in organic solvents. Suitable solvents, for example, include alcohols, ketones, esters, glycol-ethers, ethers and such solvents as formamide and dimethylformamide. Generally, the more polar solvents will be preferred but in some cases chlorinated hydrocarbons and hydrocarbons such as toluene and hexane will be suitable. The dispersibility of the 2-bromoacetophenones can be increased in the solvents above, and also in the aqueous industrial systems in which the compounds are used, by the addition of various emulsifiers and other surface active agents. Generally, the nonionic type of emulsifier will be more compatible with the 2-bromoacetophenones, but in some cases, other classes of surfactants may be used.

In order to disclose the nature of the invention still more clearly, the following illustrative examples will be given. It is understood, however, that the invention is not to be limited to the specific conditions or details set forth in these examples, except insofar as such limitations are specified in the appended claims.

EXAMPLE 1

Preparation of 2-bromo-m-hydroxyacetophenone

Practical grade m-hydroxyacetophenone, obtained from a laboratory supply house, was purified by recrystallization from water. A 1000 ml. three-neck, round-bottom flask equipped with stirrer, addition funnel and thermometer was charged with 27.23 g. (0.2 mol) of the purified m-hydroxyacetophenone and 470 ml. of chloroform and a clear solution was obtained. A solution containing 32 g. (0.2 mole) of bromine and 50 ml. of chloroform was added dropwise to the reaction flask over a 1-hour period while the temperature was maintained at 2° C. The reaction mixture was agitated an additional 3.5 hrs. at 2° C., transferred to a rotary vacuum evaporator and the chloroform removed. The brown, oily residue was transferred to a refrigerator and, while standing overnight, crystallized. The yield of crude, crystalline solid was 41.2 g. (96 percent). The solid was recrystallized three times from a 1:1 benzene-hexane solution. The white crystalline 2-bromo-m-hydroxyacetophenone melted at 70–72° C. and contained 36.8 percent bromine (Theory: 37.2 percent bromine). Ultraviolet and infrared spectra of the 2-bromo-m-hydroxyacetophenone and m-hydroxyacetophenone were compared. The ultraviolet spectrum of the bromine compound showed the same bathochromic shift of the carbonyl band and a similar decrease in magnitude of the molecular extinction coefficient as is found with other 2-bromosubstituted acetophenones. Also, the bromo derivative showed a hypsochromic shift of from 10.38 microns to 10.00 microns in the infrared. Such a shift is typical of the 2-bromoacetophenones.

EXAMPLE 2

The substituted 2-bromoacetophenones were tested by the pulp-substrate method described in U.S. Patent 2,881,070, which disclosure is hereby made a part of this application, using Aerobacter aerogenes and pulp substrates that were buffered to pH values of 5.5, 6.5, and 7.5 respectively. The results are tabulated in Table 1.

Table 1.—Percent kill of Aerobacter aerogenes in a pulp substrate at pH 5.5, 6.5 and 7.5 after 18 hrs. contact with substituted 2-bromoacetophenones

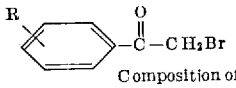

Composition of R

| pH | Concentration, parts per million | o-Methoxy, percent kill | m-Hydroxy, percent kill | m-Methoxy, percent kill | m-Acetoxy, percent kill | p-Hydroxy, percent kill | p-Methoxy, percent kill | p-Acetoxy, percent kill |
|---|---|---|---|---|---|---|---|---|
| 5.5 | 0.1 | 39 | 0 | 33 | 26 | 26 | 40 | 21 |
| | 0.3 | 3 | 98 | 0 | 37 | 88 | 49 | 32 |
| | 0.5 | 0 | 99.99 | 49 | 0 | 98.8 | 64 | 88 |
| | 1.0 | 11 | 100 | 80 | 0 | 99.9 | 81 | 97 |
| | 2.0 | 55 | 100 | 99.99 | 39 | 100 | 99.2 | 99.99 |
| | 4.0 | 98 | 100 | 99.99 | 99.2 | 100 | 100 | 100 |
| | 6.0 | 99.8 | 100 | 100 | 99.99 | 100 | 99.99 | 100 |
| | 8.0 | 99.8 | 100 | 99.99 | 100 | 100 | 100 | 100 |
| 6.5 | 0.1 | 10 | 57 | 0 | 0 | 28 | 0 | 15 |
| | 0.3 | 0 | 99.4 | 0 | 0 | 63 | 0 | 57 |
| | 0.5 | 0 | 99.8 | 0 | 0 | 96.2 | 0 | 91 |
| | 1.0 | 0 | 100 | 0 | 0 | 99.7 | 0 | 98 |
| | 2.0 | 1 | 100 | 95 | 92 | 100 | 84 | 99.8 |
| | 4.0 | 99.0 | 100 | 99.99 | 99.99 | 100 | 99.5 | 100 |
| | 6.0 | 99.8 | 100 | 99.99 | 99.99 | 100 | 99.7 | 100 |
| | 8.0 | 99.9 | 100 | 100 | 100 | 100 | 99.7 | 100 |
| 7.5 | 0.1 | 11 | 39 | 68 | 67 | 67 | 0 | 0 |
| | 0.3 | 0 | 93 | 29 | 0 | 72 | 0 | 21 |
| | 0.5 | 39 | 99.2 | 33 | 0 | 91.2 | 21 | 77 |
| | 1.0 | 0 | 99.99 | 86 | 21 | 95.5 | 43 | 86 |
| | 2.0 | 95 | 100 | 97 | 93 | 99.8 | 91 | 97 |
| | 4.0 | 99 | 100 | 99.8 | 99.6 | 100 | 99.6 | 100 |
| | 6.0 | 99.8 | 100 | 99.99 | 99.99 | 100 | 99.99 | 100 |
| | 8.0 | 99.8 | 100 | 99.99 | 100 | 100 | 100 | 100 |

All of the compounds tested were very effective against this microorganism. The 2-bromo-o-acetoxyacetophenone and the 2-bromo-o-hydroxyacetophenone were also tested, but these compounds were much less effective than the compounds of this invention.

EXAMPLE 3

The compounds 2-bromo-o-hydroxyacetophenone, 2-bromo-p-hydroxyacetophenone and 2-bromo-p-acteoxyacetophenone were tested by the pulp-substrate method described in U.S. Patent 2,881,070 using pseudomonas aeruginosa and a pulp substrate that was buffered to a pH value of 6.5. The results are tabulated in Table 2.

Table 2.—Percent kill of Pseudomonas aeruginosa in a pulp-substrate at pH 6.5 after 18 hrs. contact with substituted 2-bromoacetophenones

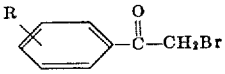

Composition of R

| Concentration, parts per million | o-Hydroxy, percent kill | p-Hydroxy, percent kill | p-Acetoxy, percent kill |
|---|---|---|---|
| 0.5 | 0 | 57 | 99.99 |
| 1.0 | 0 | 98 | 100 |
| 2.0 | 84 | 99.6 | 100 |
| 4.0 | 78 | 99.99 | 100 |
| 8.0 | 64 | 100 | 100 |
| 12.0 | 52 | 99.7 | 100 |
| 16.0 | 70 | 100 | 100 |
| 20.0 | 70 | 100 | 100 |
| 30.0 | 65 | 100 | 100 |

The 2-bromo-p-hydroxyacetophenone and the 2-bromo-p-acetoxyacetophenone were very effective in controlling the test microorganism whereas the 2-bromo-o-hydroxyacetophenone was much less effective.

EXAMPLE 4

The effect of 2-bromo-p-hydroxyacetophenone on the growth of the iron bacterium Sphaerotilus natans was determined using the method described in Example 1 of U.S. Patent 2,929,758, which disclosure is hereby made a part of this application. The results were as follows:

| Parts per million: | Percent kill |
|---|---|
| 0.1 | 100 |
| 0.5 | 100 |
| 1.0 | 100 |
| 2.0 | 100 |
| 4.0 | 100 |
| 6.0 | 100 |
| 8.0 | 100 |
| 10.0 | 100 |
| 15.0 | 100 |
| 20.0 | 100 |
| 25.0 | 100 |

EXAMPLE 5

The effect of several substituted 2-bromoacetophenones on three fngi, Aspergillus niger, Penicillium roqueforti and Chaetomium globosum, was determined in this example. A variation of the pulp-substrate method used in Examples 2 and 3 was utilized for these tests.

The pulp-substrate test method, which can be employed with various test microorganisms, simulates the conditions prevailing during actual paper-making operations, that is, those existing in a simple furnish for paper-making.

When fungi are used as test organisms, the pulp-substrate test method is modified to permit the growth of these microorganisms. The pulp substrate comprises an aqueous slurry of spruce groundwood containing 1 percent by weight (dry basis) of wood fibers and it is enriched by the addition of 0.26 percent of sodium nitrate and 0.64 percent of maltose (technical grade). Forty-gram portions of the enriched groundwood pulp slurry were added to 250 ml. Pyrex Erlenmeyer flasks fitted with loose metal caps and then sterilized. Each of the following substances was then added to the flasks in the order listed:

(1) Sterile distilled or sterile demineralized water as required in each individual case to bring the total weight of the contents of each flask to 50 grams, after allowing for all subsequent additions specified hereinafter (including inoculation with the aqueous suspension of spores and/or mycelial fragments of the test fungus).

(2) One milliliter of a 2.0 percent by weight sterile solution of rosin size. Rosin size is the pasty sodium soap of rosin containing approximately 20 to 30 percent free rosin and 30 percent water. A suitable rosin size is that known as rosin size 70D made by Papermakers' Chemical Department, Hercules Powder Co., Kalamazoo, Michigan.

(3) Solution of toxicant or control agent to be evaluated in each test, to give the concentration desired in parts per million by weight.

(4) Sterile solution of buffer salts to adjust the substrate to a pH of 4.5 to 5.0, prepared from 0.2 M solutions of potassium acid phthalate and sodium hydroxide.

(5) Inoculum consisting of 1 milliliter of an aqueous suspension of spores and/or mycelial fragments of the test organism. Aspergillus niger, Chaetomium globosum, Penicillium roqueforti are test fungi which were used for these tests.

The buffer mixtures were prepared following the procedure disclosed in U.S. Patent 2,881,070.

After the inoculant suspensions of the test fungi had been added, the flasks were allowed to incubate at a temperature of 30±1° C. for a period adequate for growth in the controls (those portions of pulp substrate which contained no toxicant). The customary periods of observation were after 7 and 14 days. Growth was recorded after each period on the basis of the following key:

4=excellent
3=good
2=poor
1=very poor, scant, questionable
0=no growth

The results are summarized in Table 3.

Table 3.—Inhibition of Aspergillus niger, Penicillium roqueforti and Chaetomium globosum by various substituted 2-bromoacetophenones in a pulp-substrate method after 14 days incubation

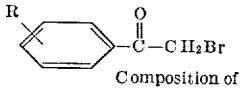

Composition of R

| Test organism | Concentration, parts per million | o-Methoxy | m-Hydroxy | m-Methoxy | m-Acetoxy | p-Hydroxy | p-Methoxy | p-Acetoxy |
|---|---|---|---|---|---|---|---|---|
| A. niger | 2 | 4 | 4 | 4 | 4 | 4 | 4 | 4 |
| | 4 | 3 | 4 | 4 | 4 | 4 | 3 | 4 |
| | 8 | 0 | 4 | 3 | 2 | 3 | 3 | 4 |
| | 12 | 0 | 3 | 1 | 1 | 0 | 0 | 3 |
| | 16 | 0 | 3 | 0 | 1 | 0 | 0 | 1 |
| | 20 | 0 | 3 | 0 | 0 | 0 | 0 | 0 |
| | 30 | 0 | 1 | 0 | 0 | 0 | 0 | 0 |
| P. roqueforti | 2 | 3 | 4 | 4 | 4 | 3 | 0 | 2 |
| | 4 | 0 | 4 | 2 | 3 | 1 | 0 | 1 |
| | 8 | 0 | 3 | 0 | 1 | 0 | 0 | 0 |
| | 12 | 0 | 2 | 0 | 0 | 0 | 0 | 0 |
| | 16 | 0 | 2 | 0 | 0 | 0 | 0 | 0 |
| | 20 | 0 | 1 | 0 | 0 | 0 | 0 | 0 |
| | 30 | 0 | 0 | 0 | 0 | 0 | 0 | 0 |
| Ch. globosum | 2 | 3 | 3 | 3 | 3 | 4 | 4 | 4 |
| | 4 | 0 | 2 | 0 | 2 | 2 | 3 | 4 |
| | 8 | 0 | 2 | 0 | 0 | 0 | 0 | 4 |
| | 12 | 0 | 2 | 0 | 0 | 0 | 0 | 4 |
| | 16 | 0 | 2 | 0 | 0 | 0 | 0 | 0 |
| | 20 | 0 | 2 | 0 | 0 | 0 | 0 | 0 |
| | 30 | 0 | 0 | 0 | 0 | 0 | 0 | 0 |

The concentrations at which the monosubstituted 2-bromoacetophenones are effective against the fungi are higher than the effective concentrations with the bacteria. However, this is fairly typical of many microbicides and the effective concentrations are lower than those used for many commercial fungicides.

While particular embodiments of the invention have been described, it will be understood, of course, that the invention is not limited thereto since many modifications may be made in the products and processes of this invention as will be apparent to those skilled in the art. As for example, the monosubstituted 2-bromoacetophenones disclosed heerin are useful for inhibiting the microbiological deterioration of different kinds of pulp which are stored and shipped commercially with a water content of 25 to 75 percent based on the weight of the wet pulp as shipped. It is, therefore, contemplated to cover by the appended claims any such modifications as fall within the true spirit and scope of the invention.

The invention having thus been described, what is claimed and desired to be secured by Letters Patent is:

[1. A method of inhibiting microbiological deterioration of an organic substance that is susceptible to deterioration by the action of microorganisms and inhibiting the formation of slime in aqueous fluids that are in contact with such substance which comprises adding to said aqueous fluids a monosubstituted 2-bromoacetophenone having the formula:

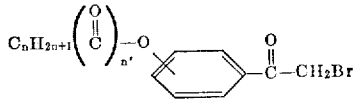

wherein n and n′ are integers varying from 0 to 1 and when n is 0, n′ is 0 characterized in that when n is 1 and n′ is 0, the point of attachment is at any one of the positions designated as ortho, meta, and para and when n and n′ are each 0 and when n and n′ are each 1, the point of attachment is at any one of the positions designated as meta and para in an amount varying from 0.1 to 500 parts per million parts of said aqueous fluids.]

[2. A method of inhibiting microbiological deterioration of an organic substance that is susceptible to deterioration by the action of microorganisms and inhibiting the formation of slime in aqueous fluids that are in contact with such substance, which comprises adding to said aqueous fluids 2-bromo-p-methoxyacetophenone in an amount varying from 0.1 to 500 parts per million parts of said aqueous fluids.]

[3. A method of inhibiting microbiological deterioration of an organic substance that is susceptible to deterioration by the action of microorganisms and inhibiting the formation of slime in aqueous fluids that are in contact with such substance, which comprises adding to said aqueous fluids 2-bromo-p-hydroxyacetophenone in an amount varying from 0.1 to 500 parts per million parts of said aqueous fluids.]

4. A method of inhibiting microbiological deterioration of an organic substance that is susceptible to deterioration by the action of microorganisms and inhibiting the formation of slime in aqueous fluids that are in contact with such substance, which comprises adding to said aqueous fluids 2-bromo-p-acetoxyacetophenone in an amount varying from 0.1 to 500 parts per million parts of said aqueous fluids.

[5. The method of controlling the growth and deposition of slime-forming microorganisms in flowing-water systems, which comprises adding to the flowing water in such systems a monosubstituted 2-bromoacetophenone as defined in claim 1 in an amount varying from 0.1 to 500 parts per million parts of said aqueous fluids.]

6. The method of inhibiting the microbiological deterioration of cellulosic pulp used in the production of paper and the formation of slimes in aqueous fluids and on surfaces that are in contact with such pulp which comprises adding to the aqueous fluids *2-bromo-p-hydroxyacetophenone* [a monosubstituted 2-bromoacetophenone as defined in claim 1] in an amount varying from 0.1 to 500 parts per million parts of said aqueous fluids.

7. An aqueous suspension of cellulosic pulp intended for use in the production of paper which is normally susceptible to microbiological deterioration and slime formation, which contains *2-bromo-p-hydroxyacetophenone* [a monosubstituted 2-bromoacetophenone as defined in claim 1] in an amount varying from 0.1 to 500 parts per million parts of said aqueous fluids.

[8. The method of inhibiting microbiological deterioration of pulp that is susceptible to deterioration by the action of microorganisms in the presence of moisture which comprises the addition to the wet pulp of a monosubstituted 2-bromoacetophenone as defined in claim 1 in an amount varying from 0.1 to 500 parts per million parts of said aqueous fluids.]

[9. The method of claim 1 wherein the amount of the monosubstituted 2-bromoacetophenone added to the aqueous fluids varies from 0.2 to 250 parts per million parts of said aqueous fluids.]

*10. The method of controlling the growth and deposition of slime-forming microorganisms in flowing-water systems, which comprises adding to the flowing water in such systems 2-bromo-p-acetoxyacetophenone in an amount varying from 0.1 to 500 parts per million parts of said aqueous fluids.*

*11. The method of inhibiting the microbiological deterioration of cellulosic pulp used in the production of paper and the formation of slimes in aqueous fluids and on surfaces that are in contact with such pulp which comprises adding to the aqueous fluids 2-bromo-p-acetoxyacetophenone in an amount varying from 0.1 to 500 parts per million parts of said aqueous fluids.*

*12. An aqueous suspension of cellulosic pulp intended for use in the production of paper which is normally susceptible to microbiological deterioration and slime formation, which contains 2-bromo-p-acetoxyacetophenone in an amount varying from 0.1 to 500 parts per million parts of said aqueous fluids.*

*13. The method of inhibiting microbiological deterioration of pulp that is susceptible to deterioration by the action of microorganisms in the presence of moisture which comprises the addition to the wet pulp of 2-bromo-p-acetoxyacetophenone in an amount varying from 0.1 to 500 parts per million parts of said aqueous fluids.*

*14. A method of inhibiting microbiological deterioration of an organic substance that is susceptible to deterioration by the action of microorganisms and inhibiting the formation of slime in aqueous fluids that are in contact with such substance, which comprises adding to said aqueous fluids 2-bromo-m-acetoxyacetophenone in an amount varying from 0.1 to 500 parts per million parts of said aqueous fluids.*

*15. The method of inhibiting the microbiological deterioration of cellulosic pulp used in the production of paper and the formation of slimes in aqueous fluids and on surfaces that are in contact with such pulp which comprises adding to the aqueous fluids 2-bromo-m-hydroxyacetophenone in an amount varying from 0.1 to 500 parts per million parts of said aqueous fluids.*

*16. An aqueous suspension of cellulosic pulp intended for use in the production of paper which is normally susceptible to microbiological deterioration and slime formation, which contains 2-bromo-m-hydroxyacetophenone in an amount varying from 0.1 to 500 parts per million parts of the aqueous fluids.*

References Cited by the Examiner

The following references, cited by the Examiner, are of record in the patented file of this patent or the original patent.

UNITED STATES PATENTS

| | | | |
|---|---|---|---|
| 2,726,264 | 12/1955 | Gregory | 167—30 |
| 2,855,439 | 10/1958 | Kundiger et al. | 167—30 |
| 2,901,394 | 8/1959 | Rosher | 162—161 |
| 3,013,079 | 12/1961 | Pearson et al. | 260—592 |
| 3,021,256 | 2/1962 | Bollenback et al. | 162—161 |
| 3,184,379 | 5/1965 | Lukes et al. | 167—30 X |

FOREIGN PATENTS

| | | |
|---|---|---|
| 607,538 | 9/1948 | Great Britain. |
| 749,742 | 5/1956 | Great Britain. |

OTHER REFERENCES

Chemical Abstracts, vol. 43, p. 5446e (1949).
Chemical Abstracts, vol. 44, p. 2973g (1950).
Chemical Abstracts, vol. 49, p. 3883c (1955).
Bergel: "Some Aspects of the Chemistry of Antioxidants," "Chemistry and Industry," April 1944, pp. 127–128.

DONALL H. SYLVESTER, *Primary Examiner.*

S. L. BASHORE, *Examiner.*